(12) United States Patent
Asai et al.

(10) Patent No.: US 7,766,651 B2
(45) Date of Patent: Aug. 3, 2010

(54) REFLOW FURNACE

(75) Inventors: Toshiyuki Asai, Tokyo (JP); Motohiro Yamane, Tokyo (JP); Takayuki Matsuoka, Tokyo (JP); Atsushi Tanaka, Tokyo (JP)

(73) Assignee: Tamura FA System Corporation, Sayama-shi (JP)

( * ) Notice: Subject to any disclaimer, the term of this patent is extended or adjusted under 35 U.S.C. 154(b) by 536 days.

(21) Appl. No.: 11/689,156

(22) Filed: Mar. 21, 2007

(65) Prior Publication Data
US 2008/0014542 A1 Jan. 17, 2008

(30) Foreign Application Priority Data
Mar. 30, 2006 (JP) ............................. 2006-094990

(51) Int. Cl.
*F27B 9/04* (2006.01)
(52) U.S. Cl. ........................ 432/121; 432/152; 228/19
(58) Field of Classification Search ................. 228/19; 432/121, 152; 118/724, 725, 729
See application file for complete search history.

(56) References Cited
U.S. PATENT DOCUMENTS
5,579,981 A 12/1996 Matsumura et al.
6,996,352 B2 * 2/2006 Choi et al. .................... 399/93
7,442,037 B2 * 10/2008 Shibamura et al. .......... 432/128

FOREIGN PATENT DOCUMENTS
JP 3511396 1/2004

OTHER PUBLICATIONS
U.S. Appl. No. 11/755,328, filed May 30, 2007, Asai, et al.

* cited by examiner

*Primary Examiner*—Gregory A Wilson
(74) *Attorney, Agent, or Firm*—Oblon, Spivak, McClelland, Maier & Neustadt, L.L.P.

(57) ABSTRACT

A reflow furnace comprises: a carrier device to carry a printed circuit board with electronic components mounted thereon; a heating chamber to heat through an ambient gas the printed circuit board carried therein to solder the electronic components on a surface of the printed circuit board; and an ambient gas purification equipment including a retrieving device to retrieve a part of the ambient gas containing vaporized flux component when soldering, a heating device to heat the retrieved ambient gas to a desired temperature, an oxidation catalyst to burn the flux component contained in the heated ambient gas, and a returning device to return a high temperature gas after being burned to the heating chamber.

6 Claims, 5 Drawing Sheets

(a)

(b)

REFLOW FURNACE

BACKGROUND OF THE INVENTION

1. Technical Field

The present invention relates to a reflow furnace in which a printed circuit board mounting electronic components is soldered, in particular a reflow furnace including an ambient gas purification equipment in which the flux component vaporized during soldering and mixed in the ambient gas is effectively burn-treated.

2. Related Arts

Various electronic components are called as SMDs (Surface Mounted Devices), and are directly mounted on a surface of a printed circuit board and soldered. The soldering is performed with the use of a soldering paste. A cream flux and a particle solder are made paste to prepare the soldering paste. The soldering paste is applied to a portion to be soldered in the printed circuit board by printing, dispenser or the like, and then the electronic components are mounted thereon. The printed circuit board mounting electronic components with the soldering paste is then heated the reflow furnace to melt the soldering paste, thus soldering electronic components to the printed circuit board.

The flux in the soldering paste functions to remove an oxidized film on the metal surface to be soldered, to prevent the metal surface from being re-oxidized by heating during soldering, and to make small the surface tension of the soldering to improve wettability. Since the flux is made by melting the solid elements of pine resin, thixotropic agent, activator or the like with the use of solvent, those are vaporized when the soldering paste is heated and melted in the reflow furnace. The vaporized flux component contacts with a low temperature (up to about 110 Celsius degree) portion of the reflow furnace to be liquidated and attached onto the printed circuit board, thus deteriorating the solder, or thwarting the motion of the movable parts in the reflow furnace.

In order not to deteriorate the solder by the flux component attached onto the printed circuit board, there is proposed a flux collecting equipment in which the ambient gas including an inert gas is heated, and the flux component mixed in the ambient gas is cooled to be liquefied and collected.

The above described conventional collecting equipment is shown in FIG. 4. Electronic components are mounted the printed circuit board 10 which is carried (in a direction vertical to the surface of the drawing) in the heating chamber 103 of the reflow furnace 101 by a carrier device 105. The fan motor 109 is arranged in the upper portion of the carrier device 105. The ambient gas 113 is caused by the fan 111 driven by the motor 109 to pass through the heaters 115 and to be blown onto the carried printed circuit board, thus heated and circulated. A by-pass route 117 is arranged to by-pass the above described circulation of the ambient gas, and the heat sink 119 which is one of the heat exchanger is arranged inside of the by-pass route 117. The ambient gas 113 guided through the by-pass route 117 is cooled by the heat exchange to the outside air, thus the flux component in the ambient gas 113 is liquefied. The flux liquefied on the surface of the heat sink 119 falls in drops into the tank 121 by gravity and is collected therein arranged below the heat sink 119. The ambient gas 123 with the liquefied flux removed is returned to the heating chamber 103.

The ambient gas may be suctioned by the fan separately installed and guided into the by-pass route 117.

There is proposed an ambient gas purification equipment in which the flux gas in the soldering ambient within the soldering equipment body is oxidized by the oxygen catalyst. Refer to Japanese Patent No. 3511396.

In the above described conventional technology in which the flux is liquefied and removed, since the ambient gas 123 returned to the heating chamber is already cooled by the heat sink 119, the remaining flux component not removed in the ambient gas is liquefied at the wall surface with a low temperature, and stuck thereto.

Furthermore, the circulating ambient gas 113 is cooled by the heat sink 119, thus it is necessary to reheat the ambient gas to a required temperature. Accordingly, the consumption power of the heater becomes large, which reverses the energy conservation.

In the conventional technology in which the flux gas is oxidized, since the flux is positively oxidized and decomposed by heating the ambient gas using inflammable materials, the temperature of the gas after the treatment becomes higher, it is necessary to have an additional treatment such as the cooling of the high temperature gas or the like, thus causing an energy loss.

SUMMARY OF THE INVENTION

The present invention has been made to solve the above described problems in the prior arts, and aims to provide a reflow furnace in which the flux component in the ambient gas is effectively burned, the temperature of the heating chamber is controlled without applying a specific cooling means, and the necessary heating in the heating chamber is lowered.

Inventors have intensively studied to solve the above described problems. As a result, it has been found that if an ambient gas purification equipment is externally attached to the reflow furnace, and a part of the ambient gas containing a flux component vaporized during soldering is retrieved with the flow rate thereof controlled into the ambient gas purification equipment, the retrieved ambient gas is heated to a desired temperature therein, the flux component contained in the heated ambient gas is burned by an oxidation catalyst, and a high temperature gas after burning treatment is returned from the ambient gas purification equipment to a heating chamber, the flux component can be effectively burn-treated at the temperature of high efficient catalyst burning, thus the burned high temperature gas with the flow rate thereof controlled is returned into the heating chamber so that the temperature of the heating chamber can be effectively controlled without applying a cooling device for the high temperature gas.

The present invention is made based on the above described study result.

A first embodiment of the reflow furnace of the invention comprises: a carrier device to carry a printed circuit board with electronic components mounted thereon;

a heating chamber to heat through an ambient gas the printed circuit board carried therein to solder the electronic components on a surface of the printed circuit board; and an ambient gas purification equipment including a retrieving device to retrieve a part of the ambient gas containing vaporized flux component when soldering, a heating device to heat the retrieved ambient gas to a desired temperature, an oxidation catalyst to burn the flux component contained in the heated ambient gas, and a returning device to return a high temperature gas after being burned to the heating chamber.

In a second embodiment of the reflow furnace of the invention, said ambient gas purification equipment is externally attached to a reflow furnace body including said carrier device therein.

In a third embodiment of the reflow furnace of the invention, said retrieving device to retrieve the part of the ambient gas includes a flow rate control device of the retrieved ambient gas.

In a fourth embodiment of the reflow furnace of the invention, said ambient gas purification equipment includes a retrieving port from which the part of the ambient gas is retrieved, a returning port through which the high temperature gas is returned, and a circulatory pathway which circulates from the retrieving port to the returning port.

In a fifth embodiment of the reflow furnace of the invention, a heater for adjusting a catalyst temperature, said oxidation catalyst, and a thermocouple for controlling a temperature of said ambient gas are arranged on the way in said circulatory pathway.

In a sixth embodiment of the reflow furnace of the invention, a heater for adjusting a temperature of said ambient gas is arranged in vicinity of said retrieving port.

In a seventh embodiment of the reflow furnace of the invention, said catalyst temperature is within a range from 300 Celsius degree to 400 Celsius degree.

In an eighth embodiment of the reflow furnace of the invention, said reflow rate control device comprises an orifice or bulb arranged in either the retrieving port to retrieve the ambient gas or the returning port to return the high temperature gas.

DETAILED DESCRIPTION OF THE INVENTION

Figure 1:
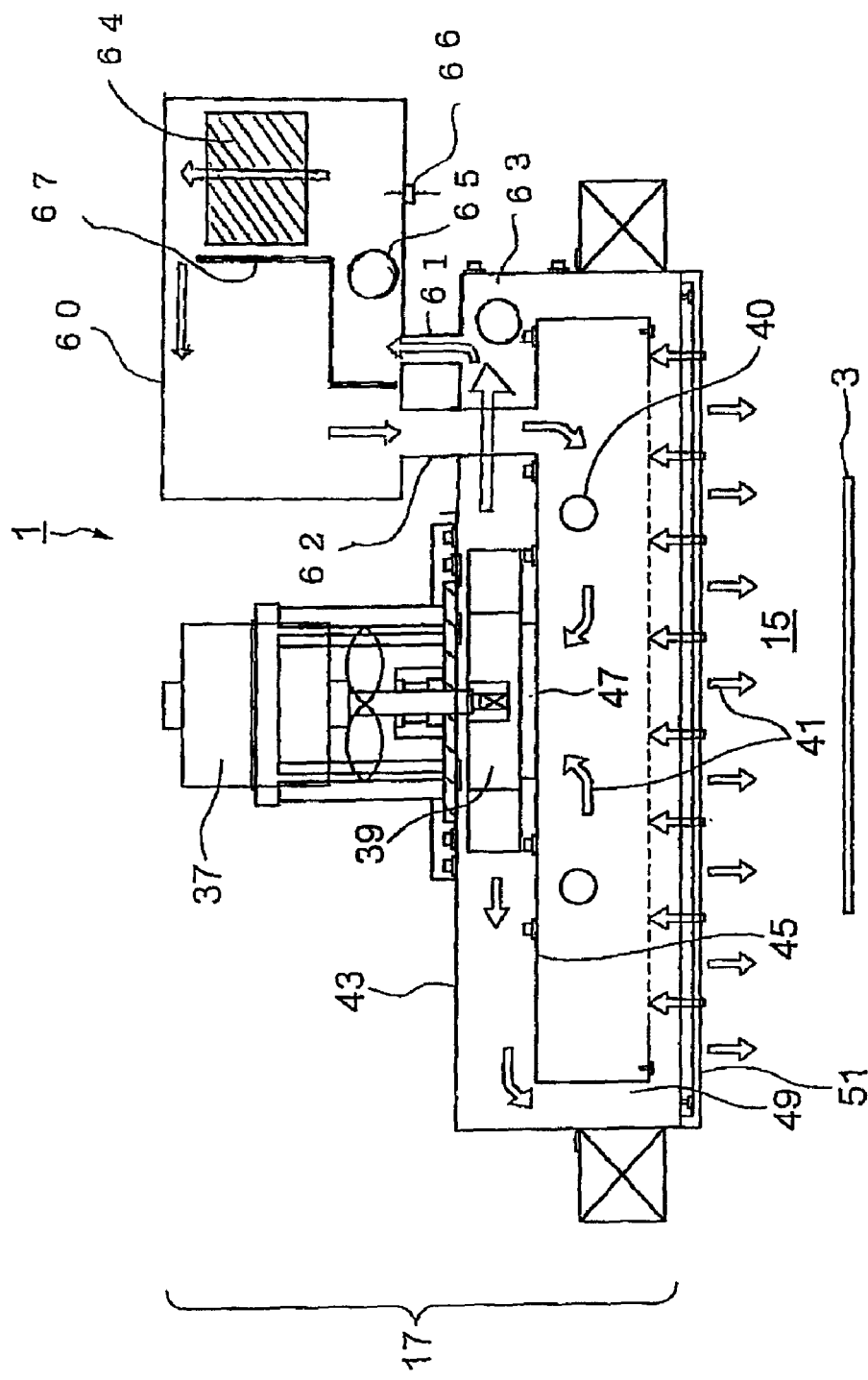
FIG. 1 is a cross sectional view showing a reflow furnace with an ambient gas purification equipment attached to the upper portion of the heating chamber according to one embodiment of the present invention.

The embodiments of the reflow furnace of the present invention are described with reference to the accompanying drawings. One of the embodiments of the reflow furnace of the invention comprises: a carrier device to carry a printed circuit board with electronic components mounted thereon; a heating chamber to heat through an ambient gas the printed circuit board carried therein to solder the electronic components on a surface of the printed circuit board; and an ambient gas purification equipment including a retrieving device to retrieve a part of the ambient gas containing vaporized flux component when soldering, a heating device to heat the retrieved ambient gas to a desired temperature, an oxidation catalyst to burn the flux component contained in the heated ambient gas, and a returning device to return a high temperature gas after being burned to the heating chamber.

The above-mentioned ambient gas purification equipment may be externally fixed in a reflow furnace body including heating chamber having the carrier device installed inside thereof. In addition, the retrieving device may include a flow rate control device-to control the ambient gas to be retrieved.

At first the entirety of the reflow furnace of the invention is described. The reflow furnace 1, as shown in the overall view of FIG. 1, and the cross sectional view of FIG. 2, has an overall configuration of extending in a horizontal direction. A plurality of printed circuit boards 3 are carried in from an inlet portion 5 on the left of the drawing and carried out of an outlet portion 7 on the right of the drawing. There is arranged a heating chamber 9 heating the printed circuit boards 3 at the center of the reflow furnace along the longitudinal direction, and a cooling chamber 11 cooling the heated printed circuit boards 3 at the end thereof along the longitudinal direction.

A long heating chamber 15 is formed along a horizontal direction so as to surround a chain conveyer 13 which is a carrier device to carry the printed circuit boards in a horizontal direction. The heating chamber 15 is arranged between a removable upper structure 17 and a lower structure 19.

The lower structure 19 has at a lower face thereof a foot portion 21 which is extendable, and a wheel 23 for movement, and at the center of the upper face a recessed portion 25 which forms the heating chamber. In addition, one end of a cylinder 27 is attached to the lower structure, which opens and closes the upper structure 17.

The upper structure 17 is rotationally fixed to the lower structure 19 around a rotational axis 29, which is arranged in parallel to the carrying direction so as to cover the recessed portion 25 of the lower structure 19 in such a manner as a roof which opens and closes. The other end of the cylinder 27 is fixed to the upper structure 17 to open and close the upper structure.

Figure 3A:
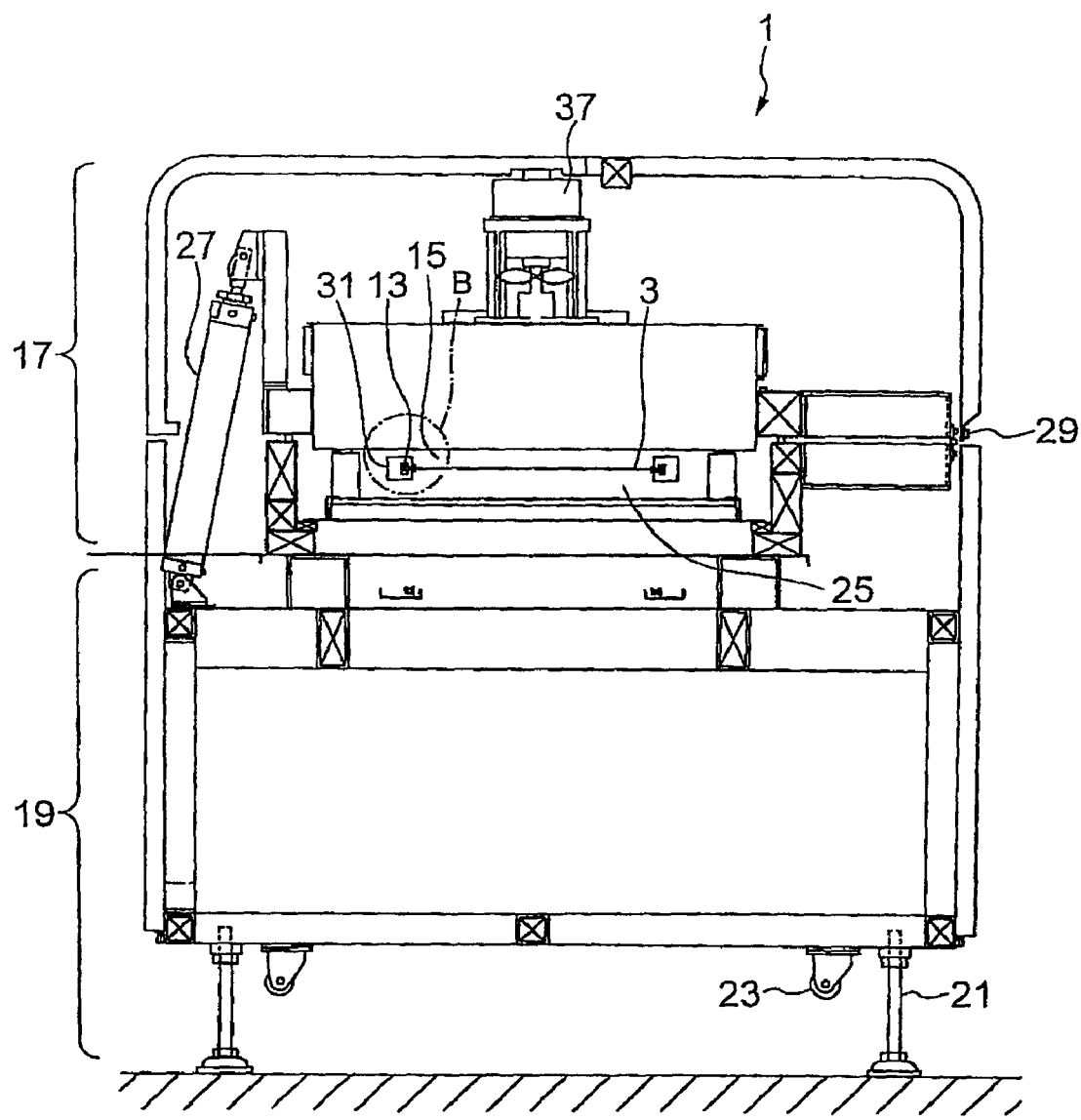
FIG. 3(A) is a cross sectional view of FIG. 2.
Figure 3B:
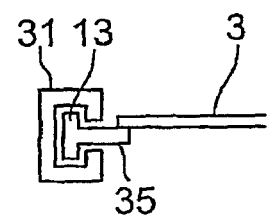
FIG. 3(B) is a view with an essential portion of FIG. 3(A) enlarged.

A pair of the chain conveyers 13 are arranged in the lower portion of the heating chamber 15 in a carrying direction, and guided by the respective guide rails 31. The chain conveyers 13 are driven by a drive sprocket mechanism 33. The printed circuit boards 3 are carried with both side ends supported. To support the printed circuit boards, a supporting protrusion 35 is formed inside of the respective chain conveyers 13 (refer to FIG. 3(B).

A plurality of hot air fan motors 37 are arranged in the upper portion of the heating chamber 9 (15) along the longitudinal direction. The ambient gas 41 is circulated by the rotating fans 39 such as a turbofan or sirocco fan.

Figure 2:
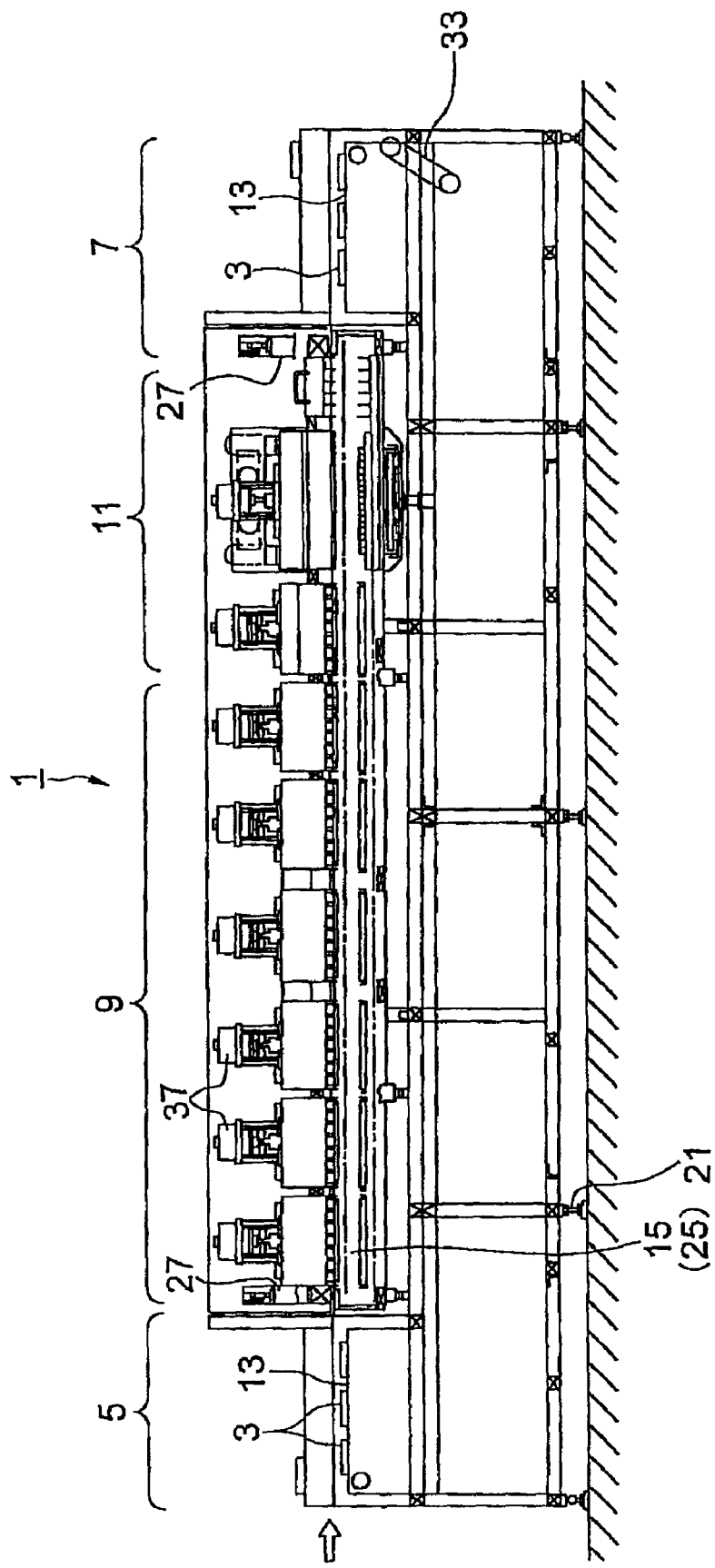
FIG. 2 is an overall sectional view of the reflow furnace.

FIG. 1 is a cross sectional view showing a reflow furnace with an ambient gas purification equipment attached to the upper portion of the heating chamber according to one embodiment of the present invention. As shown in FIG. 1, in order to the circulation, the upper portion of the heating chamber 15, which has a box-like structure opening downward, includes a double structure comprising an exterior plate 43 and a partition plate 45. A fan 39 is installed on the outside of the partition plate 45, which suctions the heated ambient gas by the heater 40 through the suction window 47 to the outside, and blows down the heated ambient gas through the outer periphery 49. The ambient gas 41 thus blown hits the mesh body 51 arranged across the opening face of the lower portion of the box-like structure. Then, the ambient gas passes through the mesh and is uniformly blown onto the printed circuit board 3.

As shown in FIG. 1, the ambient gas purification equipment 60 is attached to the upper structure 17 forming the upper portion of the heating chamber 15. More specifically, a part of the outside of the double structure of the upper portion of the heating chamber is connected to the retrieving port 61 for retrieving the ambient gas to the ambient gas purification equipment 60. The retrieve port may include a control device to control the flow rate of the ambient gas.

In addition, the ambient gas purification equipment 60 includes a retrieving port 61 to retrieve a part of the ambient gas from the furnace, a returning port 62 through which a high temperature gas is returned to the furnace, and a circulatory pathway in which the part of the ambient gas circulates from the retrieving port 61 to the returning port 62. The ambient gas purification equipment includes a heater 65 for controlling the catalyst temperature, an oxidation catalyst 64, and a thermocouple 66 for controlling the ambient gas temperature on the way in the circulatory pathway. In addition, the ambient gas purification equipment includes a partition wall 67 to separate an outward route and a homeward route.

The part of the ambient gas with the flow rate thereof controlled is heated by the heating device to a desired temperature, and passes through the oxygen catalyst with the catalyst temperature of 300 to 400 Celsius degree so that the flux component contained in the ambient gas is subjected to the oxidation treatment to be decomposed into water (vapor) and carbon dioxide. The high temperature gas thus subjected to the oxidation treatment is returned through the returning port 62 to the heating chamber.

In the present invention, since the flow rate of the ambient gas retrieved through the retrieving port is controlled and the temperature of the oxidation catalyst is controlled, the flux component is effectively burned so that the temperature of the high temperature gas does not become too high not to be controlled. More specifically, since the desired flow amount of the ambient gas is retrieved, and the retrieved ambient gas heated to the desired temperature is passed through the oxidation catalyst, the treated gas with a desired amount and higher temperature is returned to the heating chamber. The ambient gas with the temperature lowered in the heating chamber is mixed with the temperature raised gas by the oxidation catalyst, thus lowering the necessary heat in the heating chamber.

Figure 4:
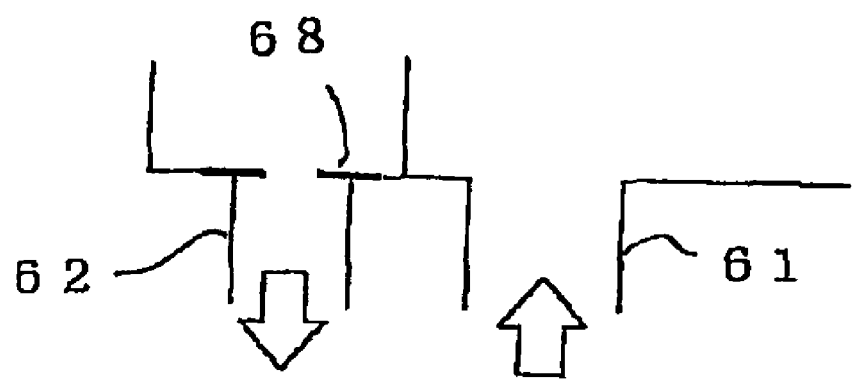
FIG. 4 is a view explaining one example of the flow rate control device.
Figure 4:
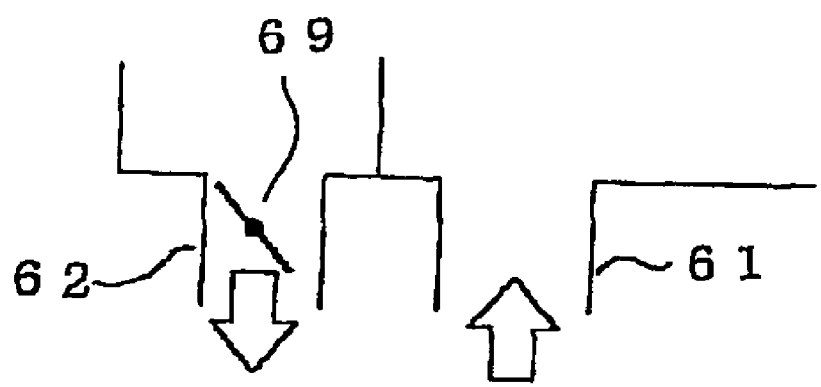
Figure 5:
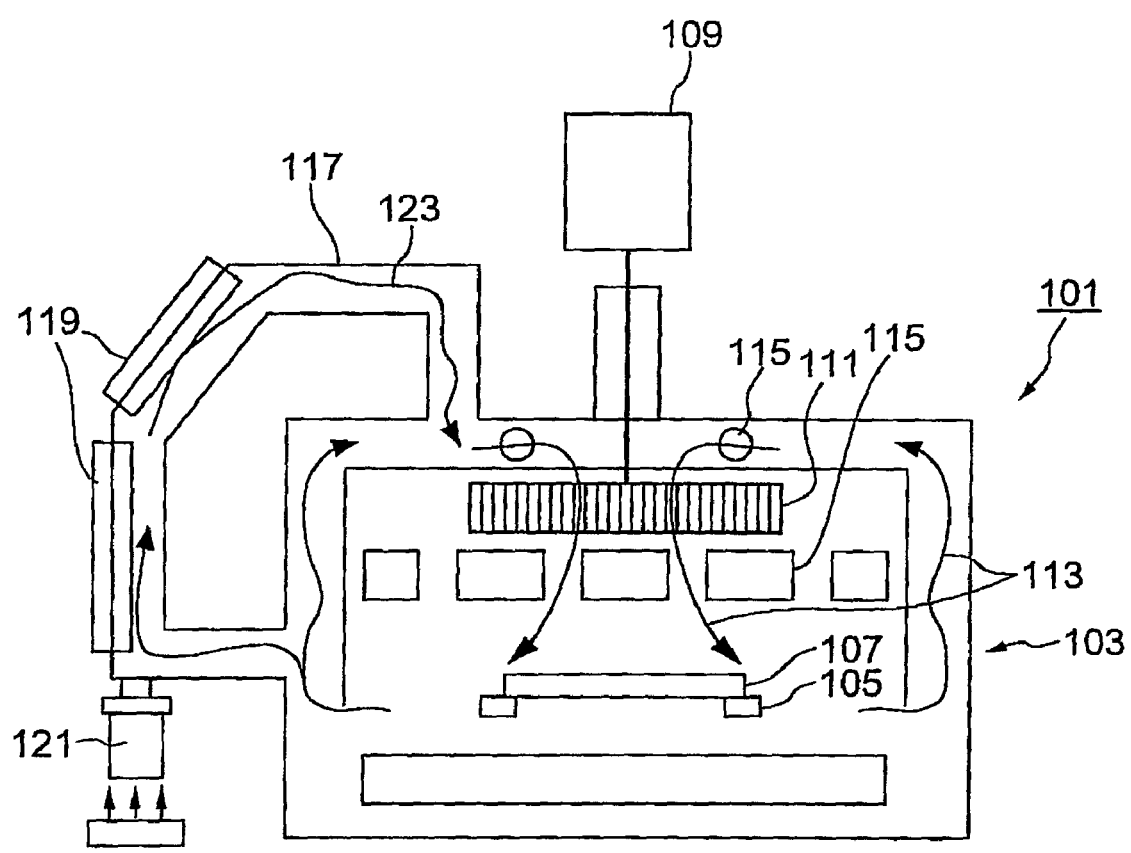
FIG. 5 is a schematic cross sectional view showing a conventional reflow furnace with a flux collecting equipment arranged in the upper portion of the heating chamber.

FIG. 4 is a view explaining one example of the flow rate control device. FIG. 4(A) shows an orifice, and FIG. 4(B) shows a bulb. As shown in FIG. 4(A), the orifice 68 is arranged in either the retrieving port to retrieve the ambient gas or the returning port 62 for returning a high temperature gas so as to statically control the flow rate of the gas. In this case, the flow rate is controlled by the preset bore of the orifice 68. As shown in FIG. 4(B), a bulb 69 is arranged in either the retrieving port 61 to retrieve the ambient gas or the returning port 62 to return the high temperature gas so as to dynamically control the flow rate. In this case, the flow rate is controlled by the closing or opening the bulb 69.

As described above, in the ambient gas purification equipment of the invention, it is not necessary to cool the temperature raised gas by a specific cooling means, and a desired high temperature gas can be obtained by controlling the flow rate of the retrieved ambient gas to be returned to the heating chamber.

The reflow furnace of the invention is further described in detail by examples.

The ambient gas is purification-treated under the following conditions.

Condition 1
 Circulatory air flow within the furnace: 600 m3/hr
 Preset temperature in the furnace: 190 Celsius degree
 Preset temperature in catalyst box(ambient gas purification equipment): 350 Celsius degree
 Circulatory air flow in catalyst box (ambient gas purification equipment): 50 m3/hr
 Temperature in the furnace under stationary state: 197 Celsius degree
 Output of the heater in the furnace: 0%

Condition 2
 Circulatory air flow within the furnace: 600 m3/hr
 Preset temperature in the furnace: 190 Celsius degree
 Preset temperature in catalyst box(ambient gas purification equipment): 350 Celsius degree
 Circulatory air flow in catalyst box (ambient gas purification equipment): 50 m3/hr
 Temperature in the furnace under stationary state: 190 Celsius degree
 Output of the heater in the furnace: 0%

Condition 3
 Circulatory air flow within the furnace: 600 m3/hr
 Preset temperature in the furnace: 190 Celsius degree
 Preset temperature in catalyst box (ambient gas purification equipment): 300 Celsius degree
 Circulatory air flow in catalyst box (ambient gas purification equipment): 50 m3/hr
 Temperature in the furnace under stationary state: 190 Celsius degree
 Output of the heater in the furnace: 0%

Condition 4
 Circulatory air flow within the furnace: 600 m3/hr
 Preset temperature in the furnace: 240 Celsius degree
 Preset temperature in catalyst box (ambient gas purification equipment): 350 Celsius degree
 Circulatory air flow in catalyst box (ambient gas purification equipment): 50 m3/hr
 Temperature in the furnace under stationary state: 240 Celsius degree
 Output of the heater in the furnace: 4%

More specifically, in the condition 1, since the temperature in the furnace is 197 Celsius degree which is beyond 190 Celsius degree of the preset temperature in the furnace, it is uncontrollable state. In the condition 2, the temperature in the furnace is the same 190 Celsius degree as the preset temperature in the furnace, and the output of the heater in the furnace is 0%, which shows a limit of control. In the condition 3, the circulatory air flow in the ambient gas purification equipment is raised to 50 m3/hr, the preset temperature in the ambient gas purification equipment is lowered to 300 Celsius degree, the preset temperature in the furnace is 190 Celsius degree, and the output of the heater in the furnace is 0%, which shows a limit of control in the same manner as the condition 2. In the condition 4, the circulatory air flow in the ambient gas purification equipment is raised to 50 m3/hr, the preset temperature in the ambient gas purification equipment is set to be 350 Celsius degree, the preset temperature in the furnace is 240 Celsius degree, and the output of the heater in the furnace is 4%, which shows within a range of controllability. Incidentally, the average output of the heater in the furnace is 20%.

As described above, since the flow rate of the retrieved ambient gas and the oxidation catalyst temperature in the ambient gas purification equipment are controlled to burn-treat the flux and to return the high temperature gas into the furnace, the temperature in the furnace comes to a controllable state.

In the ambient gas purification equipment, a part of the ambient gas containing the flux component vaporized during soldering is retrieved with the flow rate thereof controlled, the retrieved ambient gas is heated to a desired temperature, the flux component contained in the ambient gas thus heated is burned by the oxidation catalyst, and the high temperature gas after burn-treated is returned to the heating chamber, thus the flux can be effectively burn-treated at the temperature of effective catalyst burning, and the temperature raised gas with the flow rate thereof controlled is returned to the heating chamber to result in that it is not necessary to require a cooling device to cool the high temperature gas, and that the temperature of the heating chamber can be effectively controlled.

Thus, according to the present invention, it is possible to provide a reflow furnace in which the flux component in the ambient gas is effectively burned, the temperature of the heating chamber is controlled without applying a specific cooling means, and the necessary heating in the heating chamber is lowered.

What is claimed is:

1. A reflow furnace, comprising:
    a carrier device configured to carry a printed circuit board with electronic components mounted on the printed circuit board;
    a heating chamber configured to heat the printed circuit board carried in the heating chamber with an ambient gas to solder the electronic components on a surface of the printed circuit board; and
    an ambient gas purification equipment, including:
        a retrieving device including a flow rate control device configured to retrieve a controlled part of the ambient gas containing a vaporized flux component during soldering,
        a heating device configured to heat the retrieved ambient gas to a desired catalyst temperature, wherein said catalyst temperature is within a range of 300 to 400 degrees Celsius,
        an oxidation catalyst configured to burn off the flux component contained in the heated ambient gas of the controlled part, and
        a returning device configured to return a high temperature gas after being burned to the heating chamber.

2. The reflow furnace according to claim 1, wherein said ambient gas purification equipment is externally attached to the reflow furnace including said carrier device.

3. The reflow furnace according to claim 1, wherein said ambient gas purification equipment includes a retrieving port from which the part of the ambient gas is retrieved, a returning port through which the high temperature gas is returned, and a circulatory pathway which extends from the retrieving port to the returning port.

4. The reflow furnace according to claim 3, wherein the heating device for setting the catalyst temperature, said oxidation catalyst, and a thermocouple for controlling a temperature of said ambient gas are arranged on the circulatory pathway.

5. The reflow furnace according to claim 4, wherein an additional heater for adjusting a temperature of said ambient gas is arranged in a vicinity of said retrieving port.

6. The reflow furnace according to claim 3, wherein said flow rate control device includes an orifice or bulb arranged in either the retrieving port or the returning port.

* * * * *